US006908349B2

(12) United States Patent
    Stephens

(10) Patent No.: US 6,908,349 B2
(45) Date of Patent: Jun. 21, 2005

(54) COMBINATION AC MOTOR DRIVE AND ELECTROLYZER SUPPLY FOR MARINE VESSEL

(75) Inventor: Charles Michael Stephens, Pattersonville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/677,508

(22) Filed: Oct. 2, 2003

(65) Prior Publication Data

US 2005/0075014 A1   Apr. 7, 2005

(51) Int. Cl.[7] .............................................. B60L 11/02
(52) U.S. Cl. ........................................................ 440/6
(58) Field of Search ............................................ 440/6

(56) References Cited

U.S. PATENT DOCUMENTS

| 5,449,993 A | * | 9/1995 | Davis .......................... 318/701 |
| 5,512,787 A | * | 4/1996 | Dederick ..................... 290/4 R |
| 6,107,691 A | * | 8/2000 | Gore et al. .................. 290/1 R |
| 6,152,059 A | * | 11/2000 | Del Raso ................... 114/74 R |
| 6,516,905 B1 | * | 2/2003 | Baumert et al. ........... 180/53.8 |
| 2003/0082424 A1 | * | 5/2003 | Kohrs et al. ................... 429/27 |

* cited by examiner

Primary Examiner—Stephen Avila
(74) Attorney, Agent, or Firm—Scully, Scott, Murphy & Presser

(57) ABSTRACT

A marine vehicle propulsion system is provided that combines a fuel cell electrical source for an AC propulsion motor for a marine vessel with an electrolyzer and a DC-AC converter. The fuel cell provides power for the AC propulsion motor. When the fuel cell is depleted, the DC-AC converter is disconnected from the AC propulsion motor and is reconnected to an AC power source from a host ship, and the power electronic DC-AC converter is disconnected from the fuel cell and reconnected to the electrolyzer. The fuel cell is replenished by operating the electrolyzer device that runs using DC power from the host ship to separate water into hydrogen gas and oxygen gas. The power electronic drive is operated in reverse to power the electrolyzer from the host ship.

19 Claims, 3 Drawing Sheets

COMBINATION AC MOTOR DRIVE AND ELECTROLYZER SUPPLY FOR MARINE VESSEL

BACKGROUND OF THE INVENTION

1. Field of the Invention

The present invention relates to propulsion generation systems for marine vessels, and more specifically, to an invention capable of combining a fuel cell for an AC propulsion motor with an electrolyzer power supply for an underwater vessel.

2. Description of the Prior Art

Generally, underwater vessels have used conventional propulsion systems. These conventional power/propulsion generation systems for underwater vessels have been limited to simple battery systems, and typically excessive and redundant power conversion equipment is required. Current underwater vessels use fuel cells as the main source of power, and this technology requires excessive power conversion equipment, which on board increases vehicle weight and cost.

Traditional marine propulsion systems generally include an energy source, such as a battery or AC generator, a power conversion means for converting the current output of the energy source, an electric motor, a coupling system for transferring the motor output, which includes shafts, bearings and linkages, a propulsor for imparting thrust to the vehicle, and a cooling system for removing waste heat from the assembly. A rectifier situated between the AC supply input and the electrolyzer is redundant with components in the motor drive.

SUMMARY OF THE INVENTION

Therefore, it is an object of the present invention to provide a marine vessel in which the need for redundant power conversion equipment is eliminated.

Accordingly, a propulsion generation system that provides for a high power in marine vessels is provided. The propulsion generation system comprises a fuel cell, an electrolyzer, a motor, a motor drive that operates in a first position to connect the fuel cell and the motor to power the motor. The motor drive also operates in a second position to connect the electrolyzer to a power supply, by operating the motor drive in reverse to power the electrolyzer.

The propulsion generation system further comprises a DC-AC converter for converting direct current from the fuel cell to alternating current for the motor when the motor drive operates in a first position. The DC-AC converter converts alternating current from the power supply to direct current for the electrolyzer when the motor drive operates in a second position.

The propulsion generation system further comprises a hydrogen storage in fluid communication with the fuel cell and electrolyzer and an oxygen storage in fluid communication with the fuel cell and electrolyzer. The fuel cell uses hydrogen from the hydrogen storage and oxygen from the oxygen storage to produce direct current. Water is produced as a by-product by the fuel cell and is stored in a water storage. The electrolyzer uses direct current supplied by the DC-AC converter to reduce the water from the water storage into hydrogen and oxygen, and the hydrogen is stored in the hydrogen storage and the oxygen is stored in the oxygen storage.

The motor drive switches from a first position to a second position through a mode switch, and the power supply is a three-phase AC supply from a host ship. The motor is an AC propulsion motor for the marine vessel, which can be an underwater or surface vessel. A DC link capacitor provided in the motor drive absorbs high frequency current.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE INVENTION

Although this invention is applicable to numerous and various types of power generation and propulsion systems, it has been found particularly useful in the environment of propulsion systems for marine vessels and particularly, underwater vessels. Therefore, without limiting the applicability of the invention to marine and underwater vessels, the invention will be described in such environment.

Figure 1:
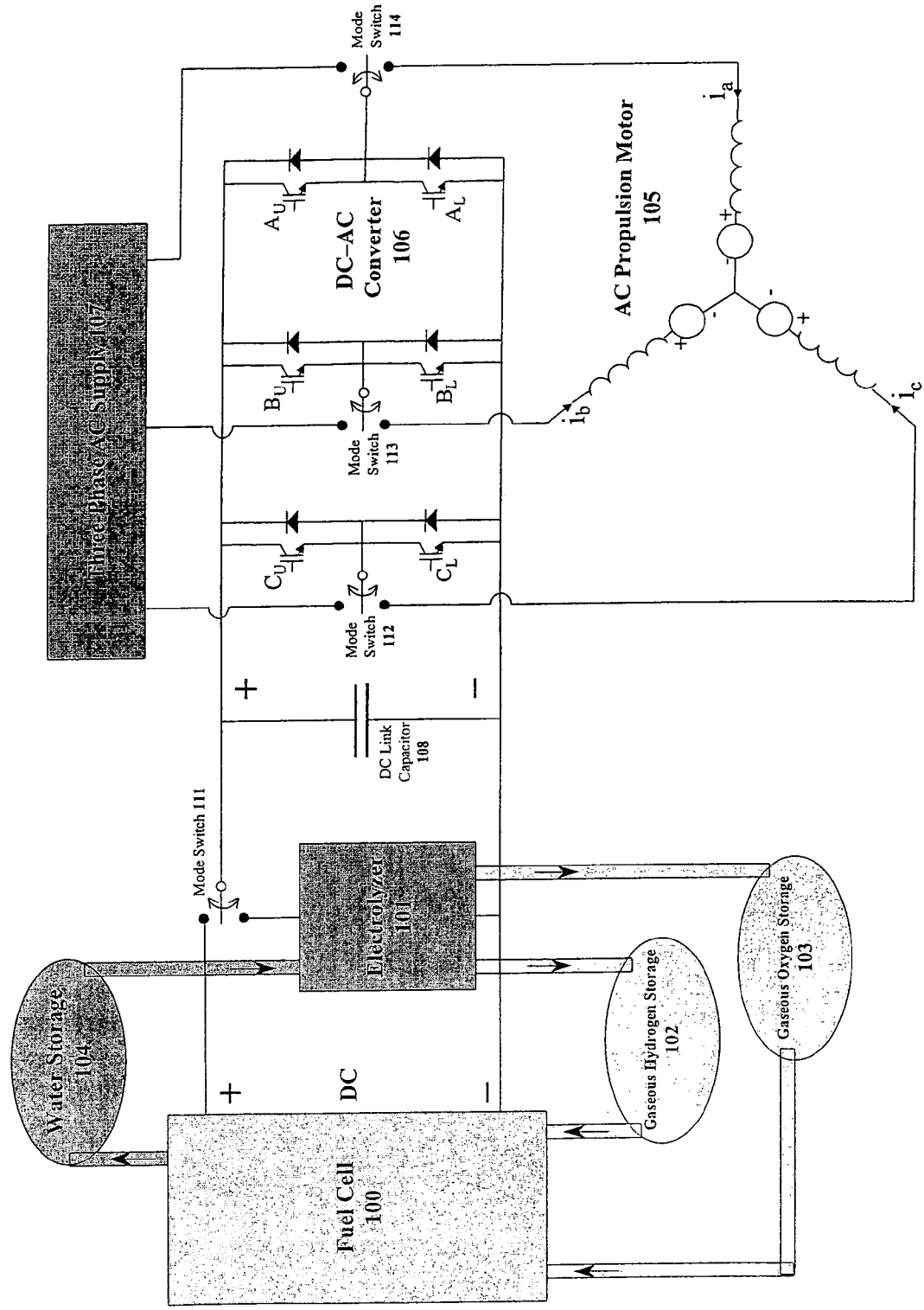
FIG. 1 illustrates a schematic representation of a system for carrying out an implementation of the present invention with the motor drive in a neutral position.

With reference to FIG. 1, there is a schematic representation of a combination AC motor drive and electrolyzer supply for a marine vehicle with the motor drive in a neutral position. Initially, hydrogen gas is stored in a gaseous hydrogen storage 102 and oxygen gas is stored in a gaseous oxygen storage 103. The gaseous hydrogen storage 102 and the gaseous oxygen storage 103 are in fluid communication with the fuel cell 100. The hydrogen and oxygen gases stored in the gaseous hydrogen storage 102 and the gaseous oxygen storage 103, respectively, are the reactants for a regenerative fuel cell 100 that produces electricity and water as a by-product. The water by-product is stored in the water storage 104 for later conversion back into $H_2$ and $O_2$. The mode switches 111, 112, 113 and 114 are in a neutral position.

Figure 2:
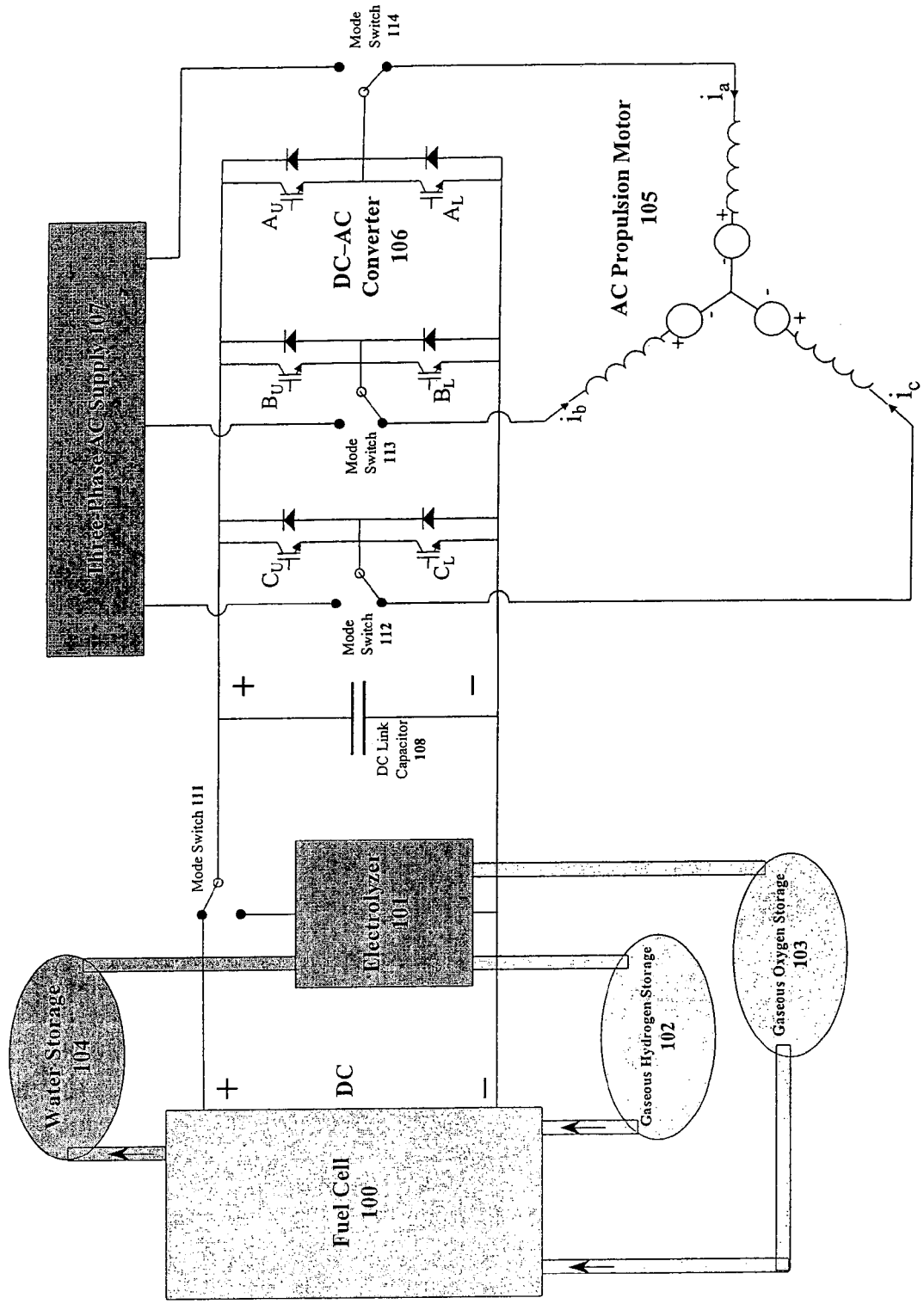
FIG. 2 illustrates a schematic representation of a system for carrying out an implementation of the present invention with the motor drive in a first position.

In FIG. 2, the fuel cell 100 provides direct current DC that is fed to a DC-AC converter 106 with the mode switch 111 in the top position. The DC-AC converter 106 converts the direct current into alternating current by gating activity applied to transistors $A_U$, $B_U$, $C_U$, $A_L$, $B_L$ and $C_L$. Alternating current $i_a$, $i_b$, $i_c$ is thereby supplied to an AC propulsion motor 105 with the mode switch 112 in the bottom position, the mode switch 113 in the bottom position, and the mode switch 114 in the bottom position. The AC propulsion motor propels the marine vessel. If the fuel cell 100 is not capable of absorbing high-frequency current, which results from operation of the motor drive, then the DC link capacitor 108 will be able to do so. The gating activity applied to transistors $A_U$, $B_U$, $C_U$, $A_L$, $B_L$ and $C_L$ regulates the current flow in the motor drive.

A problem occurs in the prior art systems in that the fuel cell would be depleted once the hydrogen gas and the oxygen gas run out in the gaseous hydrogen storage and the gaseous oxygen storage, respectively, and redundant power conversion equipment would need to be connected to re-charge the fuel cell. Consequently, it would take more time, equipment and expense to re-charge the fuel cell.

Figure 3:
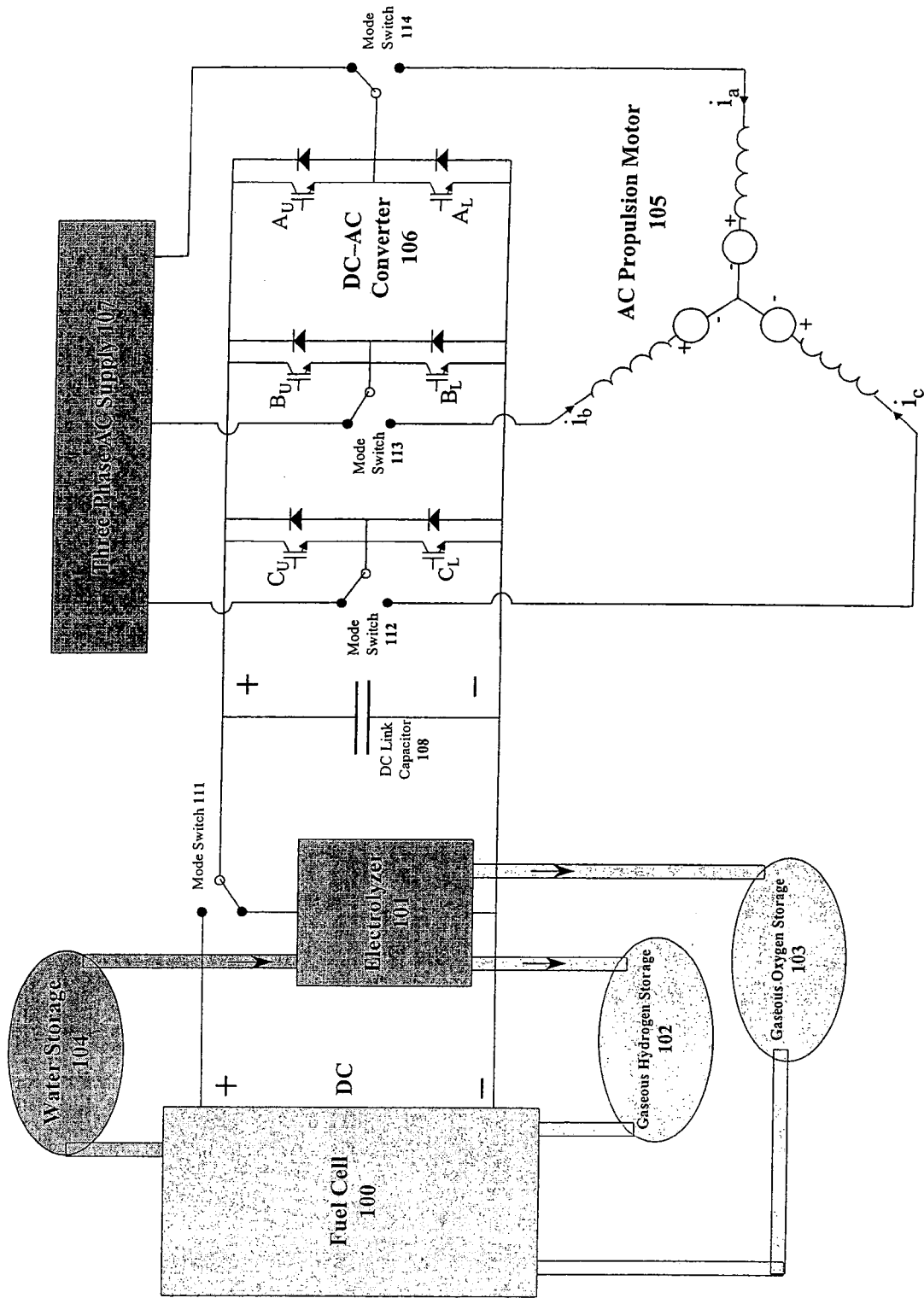
FIG. 3 illustrates a schematic representation of a system for carrying out an implementation of the present invention with the motor drive in a second position.

The present invention solves this problem by providing for a quick connection and requiring less equipment in order to re-charge the fuel cell. In accordance with the present invention, as shown in FIG. 3, the problem is solved in that the DC-AC converter 106 is disconnected from the AC propulsion motor 105 and reconnected to a three-phase AC supply 107 from a host ship by switching the mode switch 112 to the top position, the mode switch 113 to the top position, and the mode switch 114 to the top position. The DC-AC converter 106 is also disconnected from the fuel cell 100 and reconnected to the electrolyzer 101 by switching the mode switch 111 to the bottom position.

The three-phase AC supply 107 from a host ship provides alternating current to the DC-AC converter 106. The alternating current enters the DC-AC converter 106 with the mode switch 112 in the top position, the mode switch 113 in the top position, and the mode switch 114 in the top position. The DC-AC converter 106 converts the alternating current into direct current, and feeds the direct current to the electrolyzer 101.

The stored water in the water storage 104 is converted back into hydrogen gas and oxygen gas by running the electrolyzer 101. The electrolyzer 101 operates on direct current supplied from the DC-AC converter 106. Water enters the electrolyzer from the water storage 104. The electrolyzer 101 breaks down the water from the water storage 104 into hydrogen gas and oxygen gas. The hydrogen gas and oxygen gas are then stored in gaseous hydrogen storage 102 and gaseous oxygen storage 103, respectively.

Thus, the hydrogen and oxygen gas reactants for the fuel cell 100 are now refilled in the gaseous hydrogen storage 102 and gaseous oxygen storage 103, respectively, and the fuel cell 100 can be used again to supply direct current to the DC-AC converter 106. The DC-AC converter 106 is disconnected from the three-phase AC supply and reconnected to the AC propulsion motor by turning the mode switches 112, 113 and 114 back to the bottom position. The DC-AC converter 106 is also disconnected from the electrolyzer and reconnected to the fuel cell 100 by turning the mode switch 111 back to the top position. The DC-AC converter 106 then converts the direct current from the fuel cell 100 into alternating current to be fed to the AC propulsion motor 105 for the marine vessel.

The present invention provides several advantages that solves the problems with prior art systems. This system is more efficient than standard propulsion systems, by providing a system that eliminates the need for redundant power conversion equipment, which results in less vehicle weight and less cost.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A propulsion generation system for a marine vessel comprising:
   a fuel cell;
   an electrolyzer;
   a power supply;
   a motor; and
   a motor drive comprising a DC-AC converter that operates in a first position to connect said fuel cell to said motor to power said motor;
   wherein the same motor drive operates in a second position to connect said electrolyzer to said power supply.

2. The propulsion generation system of claim 1, wherein said DC-AC converter converts direct current from said fuel cell to alternating current for said motor when said motor drive operates in said first position.

3. The propulsion generation system of claim 1, wherein said DC-AC converter converts alternating current from said power supply to direct current for said electrolyzer when said motor drive is in said second position.

4. The propulsion generation system of claim 1, further comprising a hydrogen storage in fluid communication with said fuel cell and electrolyzer and an oxygen storage in fluid communication with said fuel cell and electrolyzer.

5. The propulsion generation system of claim 4, wherein said fuel cell uses hydrogen from said hydrogen storage and oxygen from said oxygen storage to produce direct current.

6. The propulsion generation system of claim 5, wherein water is produced as a by-product by said fuel cell and is stored in a water storage.

7. The propulsion generation system of claim 3, wherein said electrolyzer uses direct current from said DC-AC converter to reduce water from a water storage into hydrogen and oxygen.

8. The propulsion generation system of claim 7, wherein said hydrogen is stored in said hydrogen storage and said oxygen is stored in said oxygen storage.

9. The propulsion generation system of claim 1, wherein said motor drive is switched from a first position to a second position through a mode switch.

10. The propulsion generation system of claim 1, wherein said power supply is a three-phase AC supply from a host ship.

11. The propulsion generation system of claim 1, wherein said motor is an AC propulsion motor.

12. The propulsion generation system of claim 1, further comprising a DC link capacitor in said motor drive for absorbing high frequency current.

13. The propulsion generation system of claim 1, wherein said marine vessel is an underwater vessel.

14. A propulsion generation method for a marine vessel comprising:
    powering a motor by a fuel cell by operating a motor drive comprising a DC-AC converter in a first position; and
    powering an electrolyzer by a power supply by operating the same motor drive in a second position.

15. The propulsion generation method of claim 14, further comprising converting direct current from said fuel cell to alternating current for said motor when said motor drive operates in said first position.

16. The propulsion generation method of claim 14, further comprising converting alternating current from said power supply to direct current for said electrolyzer when said motor drive is in said second position.

17. An apparatus for propulsion generation for a marine vessel comprising:
- a fuel cell;
- an electrolyzer;
- a power supply;
- a motor; and
- a motor drive comprising a DC-AC converter that operates in a first position to connect said fuel cell to said motor to power said motor;

wherein the same motor drive operates in a second position to connect said electrolyzer to said power supply.

18. The propulsion generation apparatus of claim 17, wherein said DC-AC converter converts direct current from said fuel cell to alternating current for said motor when said motor drive operates in said first position.

19. The propulsion generation apparatus of claim 17, wherein said DC-AC converter converts alternating current from said power supply to direct current for said electrolyzer when said motor drive is in said second position.

* * * * *